(12) United States Patent
Guo et al.

(10) Patent No.: US 7,379,445 B2
(45) Date of Patent: May 27, 2008

(54) PLATFORM NOISE MITIGATION IN OFDM RECEIVERS

(76) Inventors: Yongfang Guo, 400 E. Remington Dr., Apt. D239, Sunnyvale, CA (US) 94087; Xintian E. Lin, 111 N. Rengstorff Ave., #28, Mountain View, CA (US) 94043; Qinghua Li, 455 Crescent Ave., Apt. 17, Sunnyvale, CA (US) 94087

(\*) Notice: Subject to any disclaimer, the term of this patent is extended or adjusted under 35 U.S.C. 154(b) by 451 days.

(21) Appl. No.: 11/095,785

(22) Filed: Mar. 31, 2005

(65) Prior Publication Data
US 2006/0222092 A1    Oct. 5, 2006

(51) Int. Cl.
*H04J 1/00* (2006.01)

(52) U.S. Cl. ............... 370/343; 370/342; 370/310; 370/319; 370/320; 370/321; 370/338; 455/63.1; 455/67.13; 455/114.2; 455/296; 455/277.1; 375/260; 375/346

(58) Field of Classification Search ............ 455/63.1, 455/67.13, 114.2, 296, 277.1; 370/343, 42, 370/310, 319–321, 338; 375/260, 346
See application file for complete search history.

(56) References Cited

U.S. PATENT DOCUMENTS

| 5,191,576 | A  |    | 3/1993  | Pommier et al. |
| 5,721,694 | A  |    | 2/1998  | Graupe |
| 6,064,869 | A  | \* | 5/2000  | Davis et al. ............ 455/260 |
| 6,078,412 | A  |    | 6/2000  | Fuse et al. |
| 6,154,455 | A  | \* | 11/2000 | Mekkoth et al. ........ 370/342 |
| 6,370,129 | B1 |    | 4/2002  | Huang |
| 6,711,123 | B1 |    | 3/2004  | Taira |
| 6,999,723 | B2 | \* | 2/2006  | Kusbel et al. .......... 455/63.1 |
| 7,006,810 | B1 | \* | 2/2006  | Winters et al. ........ 455/277.1 |
| 7,173,972 | B2 | \* | 2/2007  | Thomson et al. ........ 375/260 |
| 7,191,387 | B1 |    | 3/2007  | Massoudi |
| 7,218,665 | B2 |    | 5/2007  | McElwain |
| 7,218,690 | B2 |    | 5/2007  | Learned |
| 2003/0212549 | A1 |    | 11/2003 | Steentra et al. |
| 2005/0163268 | A1 | \* | 7/2005  | McCallister ............ 375/346 |
| 2005/0190868 | A1 | \* | 9/2005  | Khandekar et al. ...... 375/346 |

FOREIGN PATENT DOCUMENTS

| EP | 0887976 A2    | 12/1998 |
| WO | WO-0173999 A1 | 10/2001 |
| WO | WO-03069771 A1 | 8/2003 |

OTHER PUBLICATIONS

Ghosh, M., "Bluetooth Interference Cancellation for 802.11g WLAN receivers", *IEEE International conf. on communications*, 2 of 5, ISBN: 0-7803-7802-4,(May 11, 2003),1169-1173.

\* cited by examiner

*Primary Examiner*—Steve M. D'Agosta (57) ABSTRACT

Techniques and structures are presented for use in mitigating the effects of platform noise within a wireless device.

25 Claims, 7 Drawing Sheets

PLATFORM NOISE MITIGATION IN OFDM RECEIVERS

TECHNICAL FIELD

The invention relates generally to wireless communication and, more particularly, to wireless networking.

BACKGROUND OF THE INVENTION

Wireless networking transceivers have traditionally been concerned more with interference from external sources than with internally derived interference. However, studies have shown that a significant amount of interference experienced in wireless networking receivers is generated within the wireless platform itself. In a notebook computer, for example, various clocks and other components were found to generate signals that can cause significant interference within a wireless networking receiver within the system. This platform noise is typically frequency dependent and can degrade communication performance in the associated wireless network. Techniques and structures for mitigating platform noise in wireless receivers are needed.

DETAILED DESCRIPTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 1:
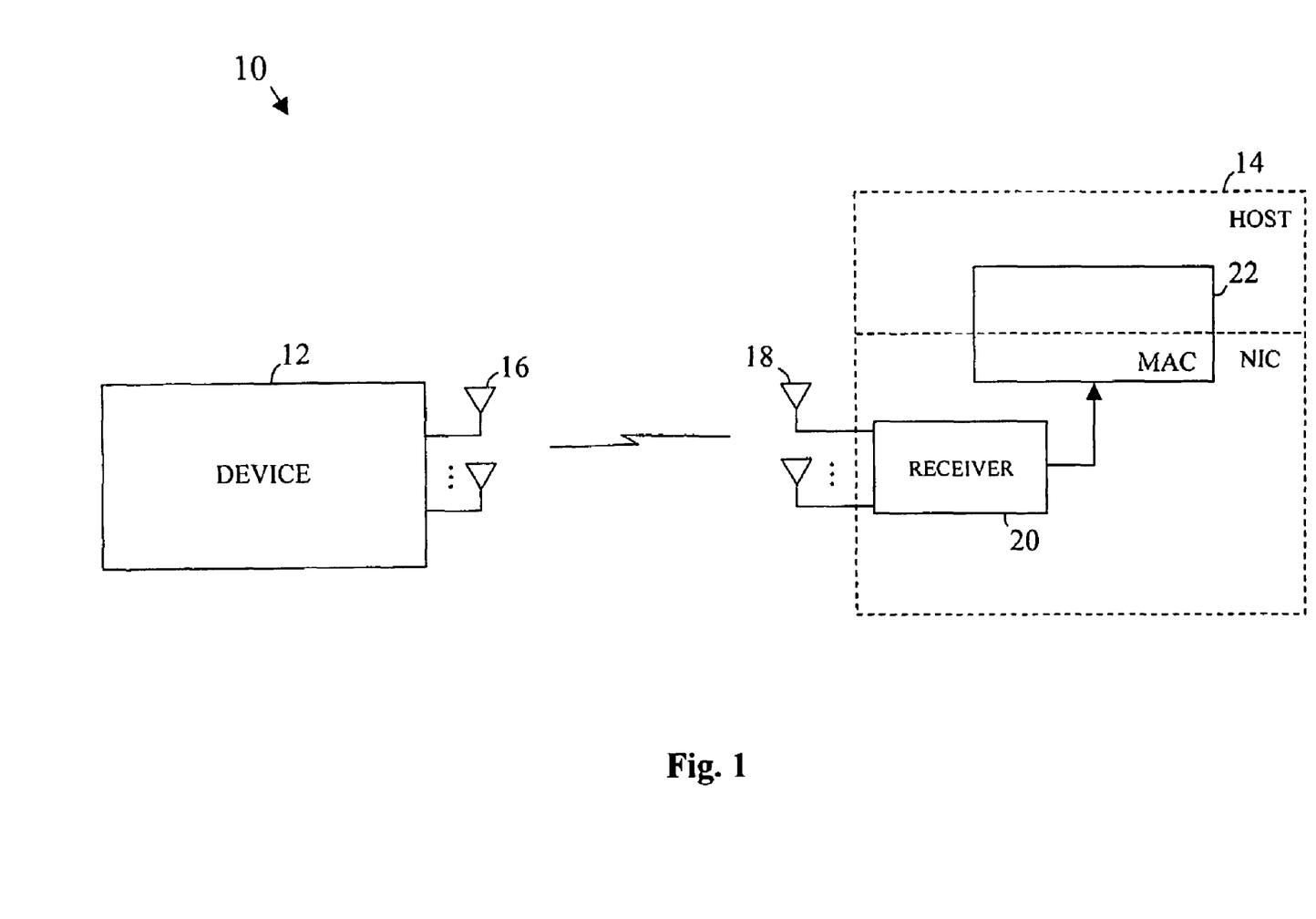
FIG. 1 is a block diagram illustrating an example wireless network arrangement that may incorporate features of the present invention.

FIG. 1 is a block diagram illustrating an example wireless network arrangement 10 that may incorporate features of the present invention. As illustrated, a first wireless device 12 is communicating with a second wireless device 14 through a wireless communication link. The first and second wireless devices are each capable of communicating using orthogonal frequency division multiplexing (OFDM) techniques. The first and second wireless devices 12, 14 may include, for example, (a) a wireless access point (AP) and a wireless client device acting in an infrastructure mode of operation, (b) two wireless client devices acting in an ad hoc mode of operation, (c) two wireless APs communicating with one another, or (d) some other network arrangement. As illustrated, the first wireless device 12 has multiple antennas 16 for use in transmitting signals into and/or receiving signals from the wireless channel. Likewise, the second wireless device 14 includes multiple antennas 18 for use in transmitting signals into and/or receiving signals from the wireless channel. Any type of antennas may be used including, for example, one or more dipole antennas, one or more patch antennas, one or more helical antennas, and/or others.

As shown in FIG. 1, the second wireless device 14 may include, among other things, a receiver 20 coupled to the multiple antennas 18 for use in processing signals received by the multiple antennas 18. Although not shown, the receiver 20 may include a radio frequency (RF) portion to process the RF receive signals and convert them to a baseband representation and a baseband processing portion to further process the baseband information. The output of the receiver 20 may be delivered to, for example, a medium access control (MAC) processing subsystem 22 for further processing. Transmitter functionality may also be provided within the second wireless device 14. If provided, the transmitter functionality may use the same antennas 18 as the receiver 20 (with, for example, a duplexer or other structure to permit antenna sharing) or different "transmit" antennas may be provided. In the illustrated embodiment, the receiver 20 and a lower portion of the MAC processing subsystem 22 (the lower MAC) are located within a wireless network interface card (NIC) and an upper portion of the MAC processing subsystem 22 is located within a host device that is carrying the wireless NIC. The wireless NIC may be removably inserted into a port (e.g., a peripheral component interconnect (PCI) slot, a PC card slot, etc.) of the host device or it may be an integral part of the host device. The host device may include, for example, a computer unit (e.g., a desktop, laptop, palmtop, tablet, etc. computer), a personal digital assistant (PDA), a cellular telephone, or some other device. Other arrangements within the second wireless device 14 may alternatively be used.

In addition to the upper portion of the MAC subsystem 22, the host device may include other components and subsystems for storing, manipulating, and/or displaying data. Some of these structures may be sources of spurious signal energy that can appear within the operational bandwidth of the receiver 20. This spurious energy can operate as interference within the receiver 20 that can degrade the overall communication performance of the device and will be referred to herein as platform noise. Some sources of platform noise within a host device may include, for example, display clocks driving LCD displays, CK410 clocks, PCI clocks, PCI Express clocks, USB clocks, Azalea codec clocks, system management clocks, and/or others. The present invention relates to methods and structures that may be used to mitigate the effects of platform noise (and other non-white noise sources) within a wireless network device.

Figure 2:
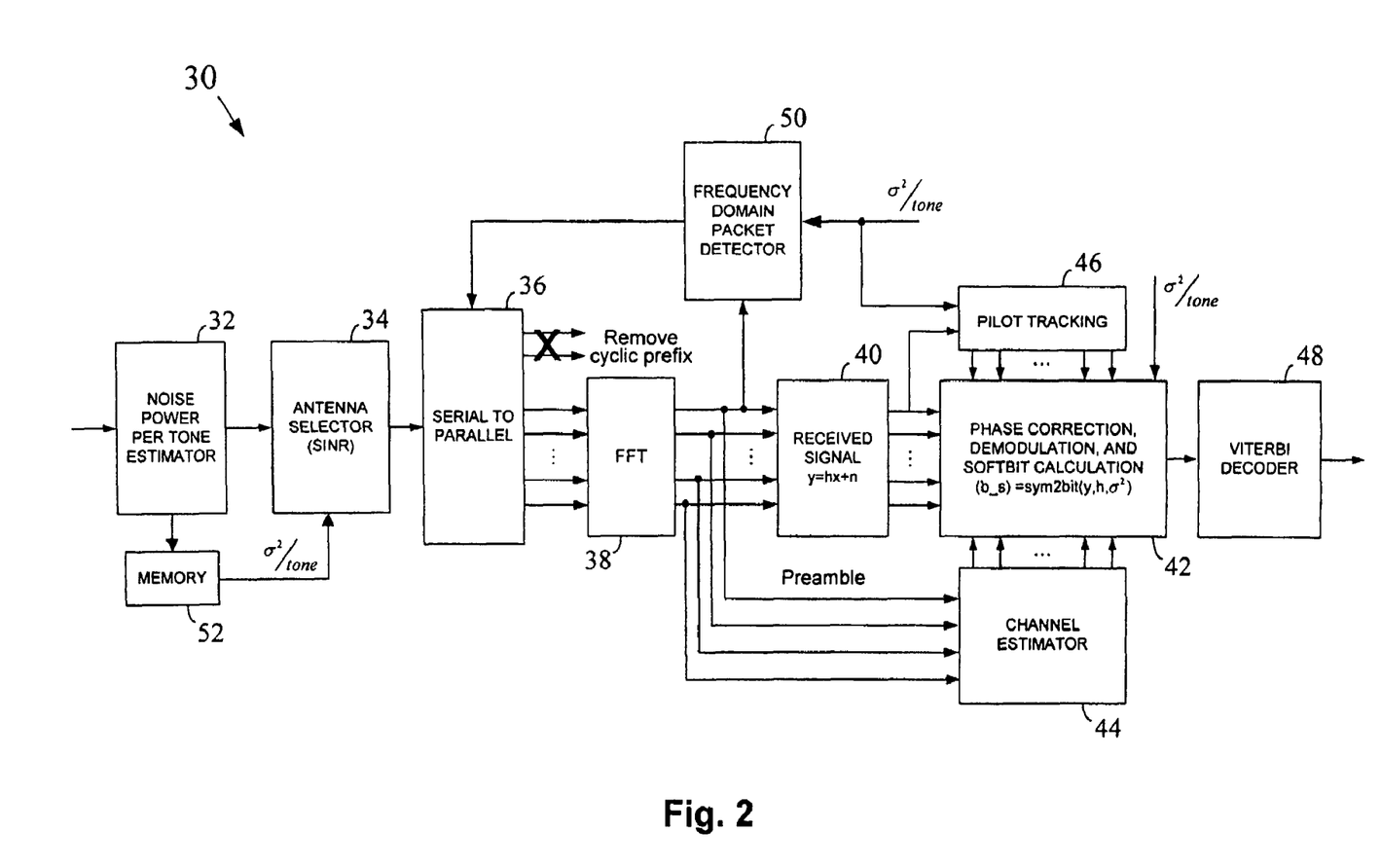
FIG. 2 is a block diagram illustrating a portion of an example receiver in accordance with an embodiment of the present invention.

FIG. 2 is a block diagram illustrating a portion of an example receiver 30 in accordance with an embodiment of the present invention. The receiver 30 may be used, for example, within the second wireless device 14 of FIG. 1 or within other wireless devices and systems. As illustrated, the receiver 30 may include one or more of: a noise power per tone estimator 32, an antenna selector 34, a serial to parallel converter 36, a fast Fourier transform (FFT) 38, a phase correction, demodulation, and soft bit calculation unit 42, a channel estimator 44, a pilot tracking unit 46, a Viterbi decoder 48, a frequency domain packet detector 50, and a memory 52. The receiver 30 is coupled to at least two antennas. In the discussion that follows, the receiver 30 will be discussed in the context of a dual antenna system, although it should be appreciated that additional antennas may also be used. The noise power per tone estimator 32 estimates the platform noise power per OFDM tone (e.g., $\sigma^2$/tone) for each of the two antennas. The platform noise per OFDM tone may be estimated during, for example, a protocol quiet period when no on-air transaction is taking place. The antenna selector 34 selects one of the available antennas for use during subsequent communication activities based on, in at least one embodiment, a signal to interference plus noise ratio (SINR) associated with the two antennas, using the platform noise per tone information. A receive signal from the selected antenna is subsequently directed to the input of the serial-to-parallel converter 36 which coverts the serial stream to a group of parallel samples for delivery to the FFT 38. Samples that are associated with a cyclic prefix of a received OFDM symbol may be discarded. In another approach, a separate cyclic prefix removal unit may be provided before the serial to parallel converter 36 to remove the cyclic prefix before conversion to parallel.

The FFT 38 converts the time based samples output by the serial to parallel converter 36 to a frequency domain representation. Although illustrated as an FFT, it should be appreciated that any discrete Fourier transform functionality may be used. The complex output samples of the FFT 38 thus represent the received signal 40 of the receiver 30 (i.e., y=hx+n for each tone). The frequency domain packet detector 50 monitors the output of the FFT 38 to determine when a packet has been received by the receiver 30. As will be described in greater detail, the frequency domain packet detector 50 may be used to reduce or eliminate the occurrence of packet detections that are "false alarms" in the receiver 30. The channel estimator 44 receives the output samples from the FFT 38 and uses the samples to generate a channel estimate h for the wireless channel. The channel estimate information may then be delivered to the phase correction, demodulation, and soft bit calculation unit 42 for use in calculating the soft bits for the Viterbi decoder 48. The pilot tracking unit 46 receives the symbols associated with the pilot tones of the received signal y for use in pilot tracking. The pilot tracking unit 46 then causes the phase correction, demodulation, and soft bit calculation unit 42 to perform phase corrections based on the pilot tracking results. As shown, the phase correction, demodulation, and soft bit calculation unit 42 also receives the platform noise per tone information from the noise power per tone estimator 32. The phase correction, demodulation, and soft bit calculation unit 42 uses the platform noise per tone information to weight the various tones based on the corresponding noise power during generation of the soft bits to be delivered to the Viterbi decoder 48. The Viterbi decoder subsequently uses the soft bits to determine the data stream that the received signal y most likely represents.

As discussed previously, the noise power per tone estimator 32 estimates the platform noise per OFDM tone (e.g., $\sigma^2$/tone) for each of the two antennas. This information may then be directed to the antenna selector 34 for use in selecting an antenna for subsequent communication activity. As will be described in greater detail below, the platform noise per tone information for the selected antenna may also be distributed to the phase correction, demodulation, and soft bit calculation unit 42, the pilot tracking unit 46, and the frequency domain packet detector 50 for use in performing their respective functions. It has been found that, in many cases, the platform noise spectrum is relatively static over time. Thus, in at least one embodiment of the present invention, the platform noise per tone information is only occasionally or periodically updated. A memory 52 may be included within the receiver 30 to store the platform noise per tone information for use by the various elements of the receiver 30 in the interim period between estimates. This may reduce processing latency by removing the need to estimate the noise power spectrum for each individual receive operation. In other embodiments, no such memory is provided.

As described above, the antenna selector 34 selects one of two (or more) available antennas for use during subsequent communication activities, based on SINR. To determine the SINR values associated with the two antennas, the antenna selector uses the platform noise per tone information generated by the noise power per tone estimator 32. In at least one embodiment of the present invention, the following metric is used for antenna selection:

$$M_k = \sum_{i=1}^{52} \log_2\left(1 + \frac{S_i^2}{\sigma_i^2}\right) \quad k\text{th antenna} \quad \text{(Equation 1)}$$

where $S_i$ is the signal strength associated with the ith tone and $\sigma_i^2$ is the noise variance associated with the ith tone. The metric $M_k$ is for use in an OFDM system that includes 52 tones. The above metric is calculated for each available antenna and the antenna having the highest metric value is selected. Other SINR-based metrics may alternatively be used.

As described above, the frequency domain packet detector 50 monitors the output of the FFT 38 to determine when a packet has been received by the receiver 30. After detecting a packet, the frequency domain packet detector 50 may cause the remainder of the receiver 30 to be made available to process the packet. Wireless packets transmitted within an IEEE 802.11 based system will typically have a number of short preambles at a beginning of the packet that each include a known data pattern of a predetermined duration (e.g., 8 microseconds). In past receivers, packet detection was performed in the time domain using a sliding window correlation approach to detect the short preambles. This technique may be represented as follows:

$$m(t) = \sum_{l=0}^{N-1} s(t+l)s^*(t+l-N)$$

where m(t) is the correlation metric, s(t) is the time sample, N is the periodicity of the preamble, and s*(t) denotes the complex conjugate of s(t). The metric m(t) would then be compared to a threshold value to determine whether a packet had arrived (e.g., m(t)>m₀ means a packet was received). The above-described technique, however, can result in the generation of "false alarms" if the noise within the received energy has the same or a similar periodicity to the short preamble (e.g., a periodicity of around 8 microseconds). The frequency domain packet detector 50 also uses a sliding window correlation approach, but in the frequency domain so that tones having a higher level of platform noise may be discounted during the packet detection process. The frequency domain version of the correlation metric above may be expressed as:

$$m(t) = \frac{1}{N}\sum_{k=0}^{N-1} \tilde{S}(t,k)\tilde{S}^*(t+T,k)$$

where $$\tilde{S}(t,k) = \sum_{l=0}^{N-1} s(t+l)e^{jk2\pi l/N}.$$

The frequency domain packet detector 50 uses a modified version of this expression to take the platform noise into account and thus reduce false alarms. The modified version may be expressed as follows:

$$m(t) = \frac{1}{N}n^2\sum_{k=0}^{N-1} \tilde{S}(t,k)\tilde{S}^*(t+T,k)/\sigma^2(k) \quad \text{(Equation 2)}$$

where $$\frac{1}{n^2} = \sum_{k=0}^{N-1} \frac{1}{\sigma^2(k)}$$

is the normalization. Other frequency domain packet detection metrics that take the platform noise per tone information into account to weight the tones may alternatively be used.

A subset of the tones within an OFDM symbol are typically pilot tones. Pilot tones may be used by a receiver of an OFDM symbol to perform phase corrections so that a receive clock associated with the receiver more closely tracks a transmit clock within the transmitter of the OFDM symbol. Each pilot tone will typically include a unique symbol that allows the pilot tone to be recognized by the receiver. Interference on the pilot tones can be very problematic for the receiver. That is, interference on one or more pilot tones may adversely affect the phase correction of the receiver to such an extent that the entire OFDM symbol may be corrupted. Interference on a data tone, on the other hand, will typically only affect the reception of the information associated with that tone. Thus, in at least one embodiment of the present invention, the pilot tones of a received OFDM symbol are weighted using the corresponding noise information to discount the noisier tones from the pilot tracking calculation. In an IEEE 802.11 based system, for example, an OFDM symbol may have 52 tones from a frequency of −26 to −1 and +1 to +26 with pilot tones at frequencies −14, −7, +7, and +14. To perform the pilot tracking, these tones may be weighted using the platform noise per tone information generated by the noise power per tone estimator 32 (which, in at least one embodiment, is stored in memory 52). For example, the pilot tones may be weighted as follows:

$$y_{(-14,-7,7,14)} \Rightarrow \frac{y_{(-14,-7,7,14)}}{\sigma}$$

where σ is the standard deviation of the per tone platform noise. Other weighting techniques may alternatively be used.

The soft bits calculated by the phase correction, demodulation, and soft bit calculation unit 42 represent the inputs that are delivered to the Viterbi decoder 48. In at least one embodiment of the present invention, the soft bits are weighted by the inverse of the noise variance per tone. This may be expressed as follows for each individual tone:

$$(b\_s) = sym2bit(y, h, \sigma^2)$$

$$\hat{x} = \underset{x \in QAM constellation}{\arg\min} |y - hx|^2;$$

$$b\_h_i = QAM2bit(\hat{x}), i = 1, \ldots, N;$$

$$b\_s_i = \log\left(\frac{P(b\_h_i = 1 | y)}{P(b\_h_i = 0 | y)}\right)(\sigma^2), i = 1, \ldots, N;$$

where b_s represents a soft bit, b_h represents a hard bit, sym2bit is a symbol to bit operator, h is the channel matrix for the tone, P(b_h$_i$=1|y) is the probability that the ith hard bit is 1 given y, P(b_h$_i$=0|y) is the probability that the ith hard bit is 0 given y, and σ² is the noise variance for the tone. For quadrature phase shift keying (QPSK), the last expression above reduces to:

$$b\_s_1 = \frac{1}{2\sigma^2}\text{Re}(yh^*)$$

$$b\_s_2 = \frac{1}{2\sigma^2}\text{Im}(yh^*)$$

Similar expressions apply for other modulation coding schemes.

In the embodiment described above, per tone noise weighting for soft bits is performed by dividing by the noise variance for each tone to discount the noisy tones. Other weighting methods may alternatively be used. In one possible alternative, a binary weighting technique is used. That is, if the inverse of the noise variance for a particular tone is greater than a threshold value, then a weight of 1 is used for the tone; otherwise, a weight of 0 is used. This technique ignores tones that are at or above a given noise level and only considers tones that are below the given noise level. In another possible approach, a binary shift form of weighting may be used to discount noisy tones, where the weight for a particular tone is rounded off to the nearest $2^n$, n being an integer. This may be expressed as follows:

$$w = 2^{nint\left[\log_2\left(\frac{1}{\sigma^2}\right)\right]}$$

where $$\frac{1}{\sigma^2}$$

is the noise variance for the tone and nint[x] is the nearest integer operator. This approach has been found to be comparable in performance to division by the noise variance, but at a significantly lower complexity. In addition, because the platform noise spectrum has been found in many cases to be relatively static, the weighting calculations may be performed once (or periodically) and stored to reduce overall complexity. Similar weighting techniques may be used for antenna selection, packet detection, and pilot tracking.

Figure 3:
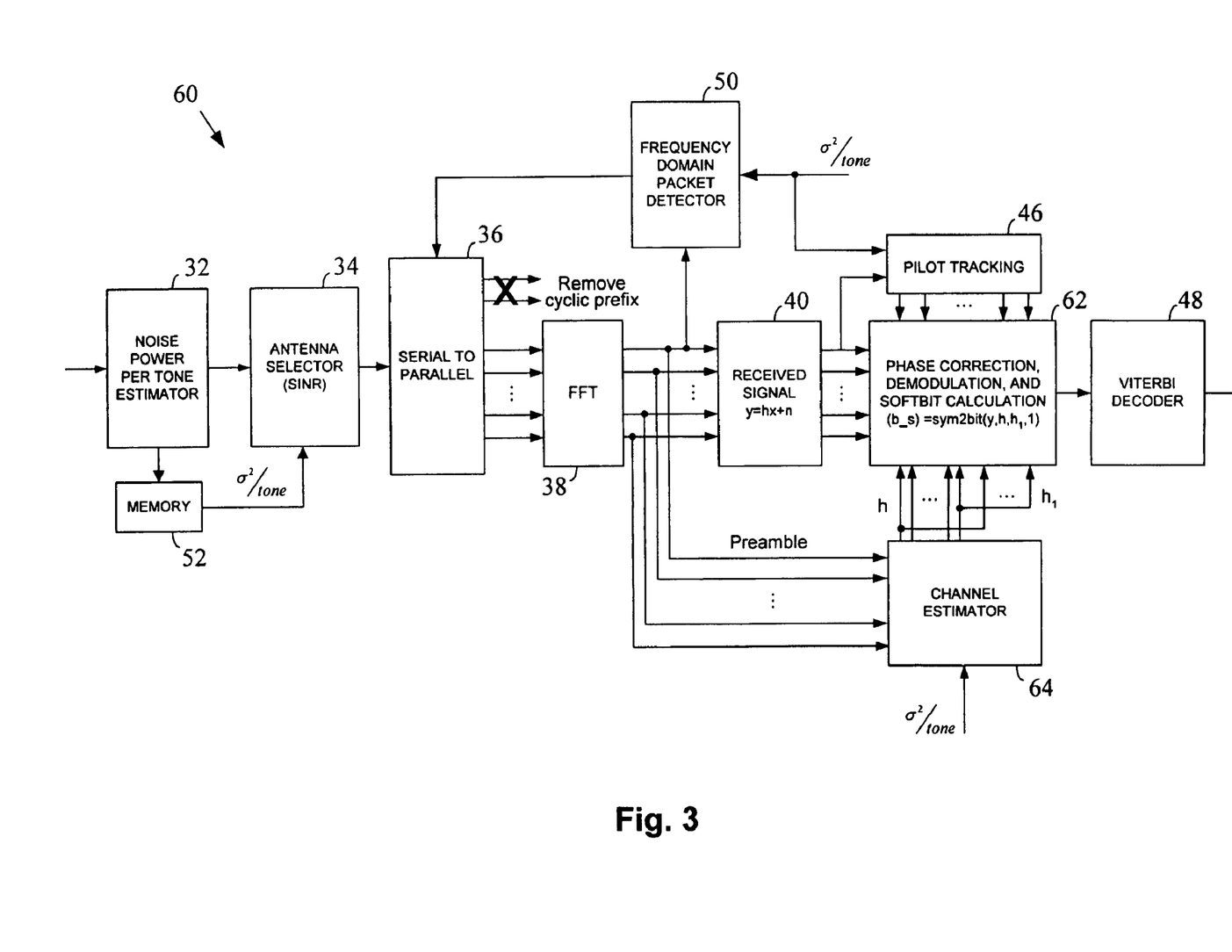
FIG. 3 is a block diagram illustrating a portion of an example receiver in accordance with another embodiment of the present invention.

FIG. 3 is a block diagram illustrating a portion of an example receiver 60 in accordance with an embodiment of the present invention. The receiver 60 is similar to the receiver 30 of FIG. 2, except for the manner in which the per tone noise weighting is performed. That is, in the receiver 30 of FIG. 2, the per tone noise weighting was performed as part of the soft bit calculation. In the receiver 60 of FIG. 3, on the other hand, the per tone noise weighting is performed as part of the channel estimation. As illustrated, the receiver 60 may include one or more of: a noise power per tone estimator 32, an antenna selector 34, a serial to parallel converter 36, a fast Fourier transform (FFT) 38, a phase correction, demodulation, and soft bit calculation unit 62, a channel estimator 64, a pilot tracking unit 46, a Viterbi decoder 48, a frequency domain packet detector 50, and a memory 52. The noise power per tone estimator 32, the antenna selector 34, the serial to parallel converter 36, the fast Fourier transform (FFT) 38, the pilot tracking unit 46, the Viterbi decoder 48, the frequency domain packet detector 50, and the memory 52 each operate in substantially the same manner described above in connection with FIG. 2. The channel estimator 64 receives the output samples from the FFT 38, as before, and uses the samples to generate a channel estimate for the wireless channel. However, the channel estimator 64 also receives the noise power per tone information from the noise power per tone estimator 32 (or memory 52) and uses the information to calculate $$h_1 = \frac{h}{\sigma^2}$$

for each of the tones. The channel estimator 64 may then transfer the h and $h_1$ matrices for each tone to the phase correction, demodulation, and soft bit calculation unit 62, which uses the matrices to generate the soft bits.

By performing the noise weighting on the estimated channels, instead of during the soft bit calculation, a significant reduction in computational complexity may be achieved. For example, thousands of additional multiplications will typically need to be performed to implement per tone noise weighting during soft bit calculation, while noise weighting on the estimated channels may only need the same number of multiplications as the number of tones being used (e.g., 52 in one embodiment). Table 1 below sets out the soft bit calculation expressions and corresponding computational complexity for the 16QAM coding scheme using per tone noise weighting in the softbit calculation (sym2bit(y,h,$\sigma^2$)), per tone noise weighting of the channel estimates (sym2bit(y,h,$h_1$,1)), and no per tone noise weighting where the noise is considered constant across the tones (sym2bit(y,h,1)). As shown, the computational complexity of the soft bit calculation is the same for the per tone noise weighting of the channel estimates as it is for the situation where no per tone noise weighting is performed. The calculation of $|H|^2$ and $h^*h_1$ were not counted in the complexity determination since they remain the same for all soft bits over one tone and can be pre-calculated.

TABLE 1

| | sym2bit(y, h, $\sigma^2$) | Complexity | sym2bit(y, h, 1) | Complexity | sym2bit(y, h, $h_1$1) | Complexity |
|---|---|---|---|---|---|---|
| b_$s_{0,n}$ | $1/\sigma^2$ Re(h * $y_n$) | 2 mults | Re(h * $y_n$) | 1 mult | Re($h_1$ * $y_n$) | 1 mult |
| b_$s_{1,n}$ | $2|h|^2/\sigma^2 - |b\_s_{0,n}|$ | 1 mult + 1 adder | $2|h|^2 - |b\_s_{0,n}|$ | 1 adder | 2 h * $h_1$ - $|b\_s_{0,n}|$ | 1 adder |
| b_$s_{2,n}$ | $1/\sigma^2$ Im(h * $y_n$) | 2 mult | Im(h * $y_n$) | 1 mult | Im($h_1$ * $y_n$) | 1 mult |
| b_$s_{3,n}$ | $2|h|^2/(\sigma^2 - |b\_s_{2,n}|)$ | 1 mult + 1 adder | $2|h|^2 - |b\_s_{2,n}|$ | 1 adder | 2 h * $h_1$ - $|b\_s_{2,n}|$ | 1 adder |

Figure 4:
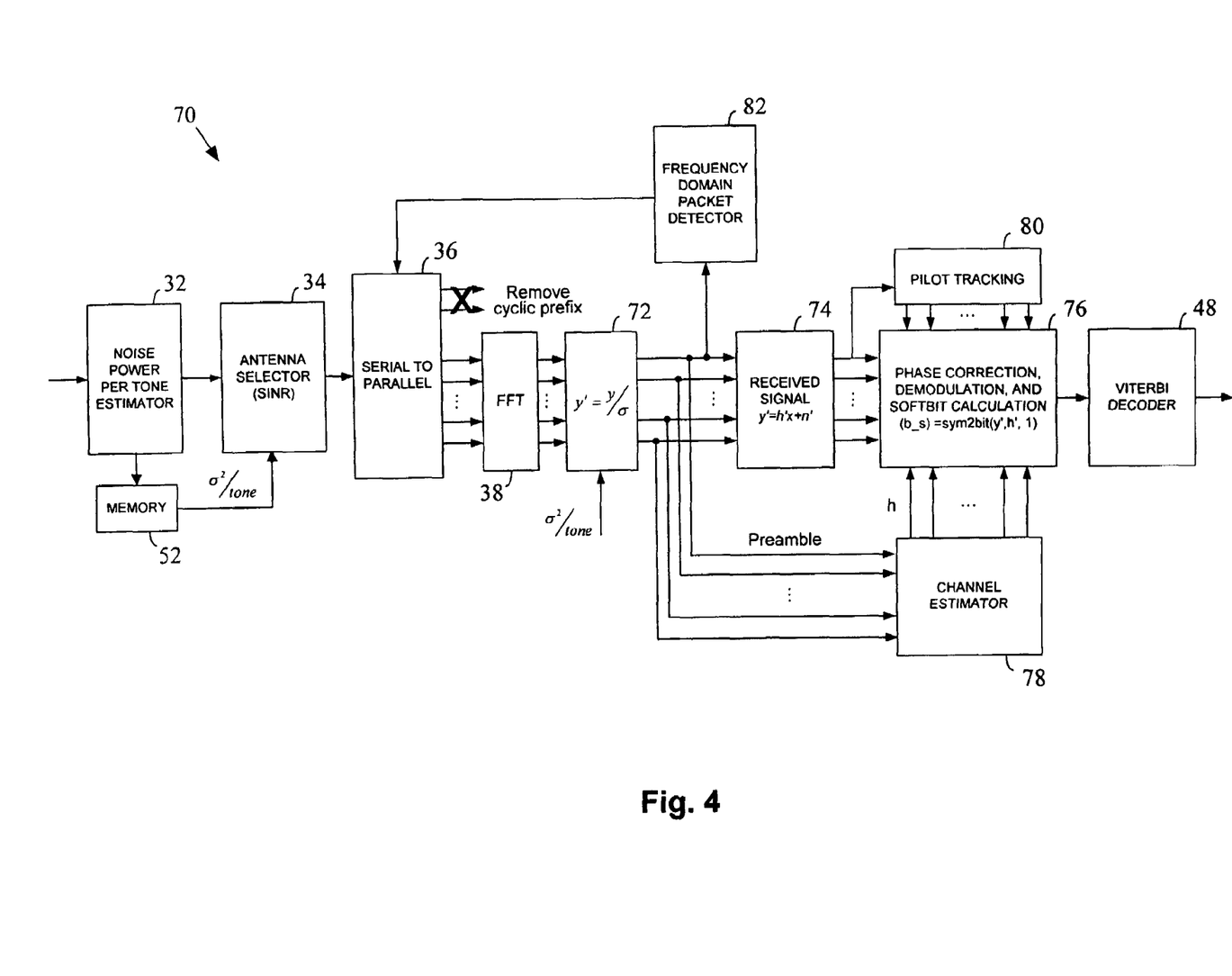
FIG. 4 is a block diagram illustrating a portion of an example receiver in accordance with still another embodiment of the present invention.

FIG. 4 is a block diagram illustrating a portion of an example receiver 70 in accordance with an embodiment of the present invention. The receiver 70 is similar to the receiver 30 of FIG. 2, except for the manner in which the per tone noise weighting is performed. That is, in the receiver 70 of FIG. 4, the per tone noise weighting is performed just after the FFT. As illustrated, the receiver 70 may include one or more of: a noise power per tone estimator 32, an antenna selector 34, a serial to parallel converter 36, a fast Fourier transform (FFT) 38, a noise power per tone weighting unit 72, a phase correction, demodulation, and soft bit calculation unit 76, a channel estimator 78, a pilot tracking unit 80, a Viterbi decoder 48, a frequency domain packet detector 82, and a memory 52. The noise power per tone estimator 32, the antenna selector 34, the serial to parallel converter 36, the fast Fourier transform (FFT) 38, the Viterbi decoder 48, and the memory 52 each operate in substantially the same manner described above in connection with FIG. 2.

As described above, the complex output samples of the FFT 38 represent the received signal of the receiver (i.e., y=hx+n for each tone). The noise power per tone weighting unit 72 applies a noise weighting factor to the received symbol y on each tone using the noise power per tone information received from the noise power per tone estimator 32 (or memory 52). This makes it appear that the modified received signal 74 (i.e., y'=h'x+n' for each tone) has a relatively flat noise spectrum across the tones. The remainder of the processing within the receiver 70 may therefore be the same as, or similar to, the receive processing within a receiver that assumes a flat noise spectrum. For example, the frequency domain packet detector 82 may perform frequency domain packet detection using a sliding window correlation approach without performing individual noise weighting on the tones and will still be able to reduce or eliminate the occurrence of false alarms. Similarly, the pilot tracking unit 80 will not have to individually weight the pilot tones for use in phase correction activities as the weighting has already been performed. The channel estimator 78 will output the modified channel matrix h'=h/σ, instead of the actual matrix h. The phase correction, demodulation, and soft bit calculation unit 76 may utilize the same soft bit calculation expressions that would be used for the situation where no per tone noise weighting is performed (e.g., see Table 1 for the expressions used for 16QAM). However, the modified channel matrix h' is used in the expression, rather than the actual matrix h.

In the embodiments described above, the noise per tone information generated within the noise power per tone estimator 32 was used to perform the antenna selection, packet detection, pilot tracking, and soft bit calculation functions. It should be appreciated, however, that one or more of these functions may be performed in a conventional fashion (i.e., not using platform noise per tone information) in various alternative embodiments of the invention. For example, in some alternative embodiments, the antenna selector 34 of FIGS. 2, 3, and 4 is replaced with an antenna selector that selects an antenna based on received signal power. Similarly, in other alternative embodiments, the frequency domain packet detector 50, 82 of FIGS. 2, 3, and 4 is replaced with a time domain packet detector that does not take noise power per tone into account. Other modifications and variations are also within the scope of the present invention.

Figure 5:
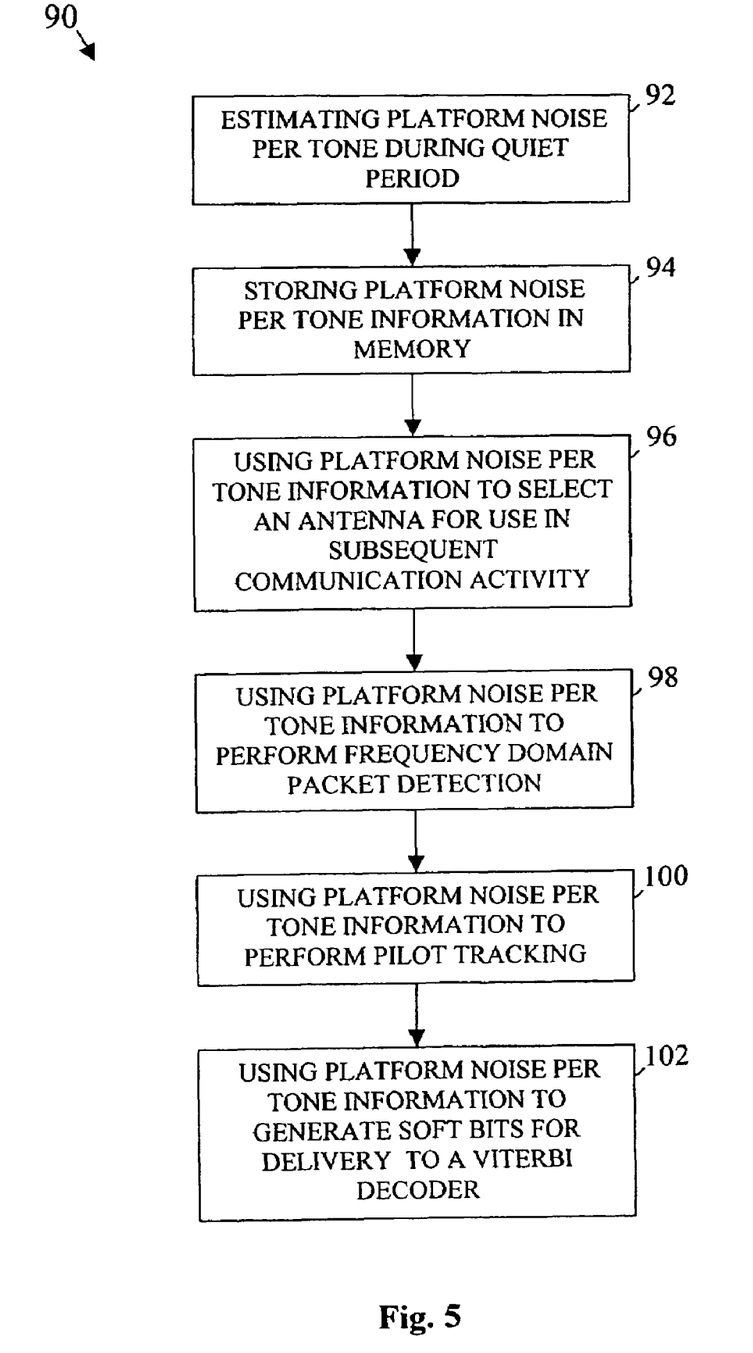
FIG. 5 is a flowchart illustrating an example method for use in mitigating platform noise within a wireless device in accordance with an embodiment of the present invention.

FIG. 5 is a flowchart illustrating an example method 90 for use in mitigating the effects of platform noise within a wireless device in accordance with an embodiment of the present invention. First, platform noise power per tone is estimated during a protocol quiet period (block 92). This platform noise power per tone information may be estimated within, for example, an on-board platform noise spectrum analyzer. The platform noise per tone information is then stored within a memory (block 94). In at least one embodiment, the memory is periodically updated by the platform noise analyzer. The platform noise per tone information is eventually used to select one of a plurality of antennas for use by the wireless device (block 96). In at least one embodiment, a metric is calculated (e.g., see Equation 1) for each of the available antennas and an antenna having the best (e.g., highest) metric value is selected. The platform noise per tone information is then used to perform frequency domain packet detection in a manner that can reduce the occurrence of packet detection false alarms in the wireless device (block 98). This frequency domain packet detection may utilize a sliding window correlation approach in the frequency domain to generate a metric (e.g., see Equation 2). A packet may be considered to be detected when the metric value exceeds a threshold level. The platform noise per tone information may also be used to perform pilot tracking in the wireless device to reduce timing errors caused by platform noise. This may be accomplished by weighting the pilot tones using the noise per tone information during pilot tracking. The platform noise power per tone information may also be used in generating soft bits for delivery to a Viterbi decoder within the wireless device (block 102). As described previously, the soft bits may be calculated in a number of different ways using the platform noise per tone information (see FIGS. 2, 3, and 4).

Figure 6:
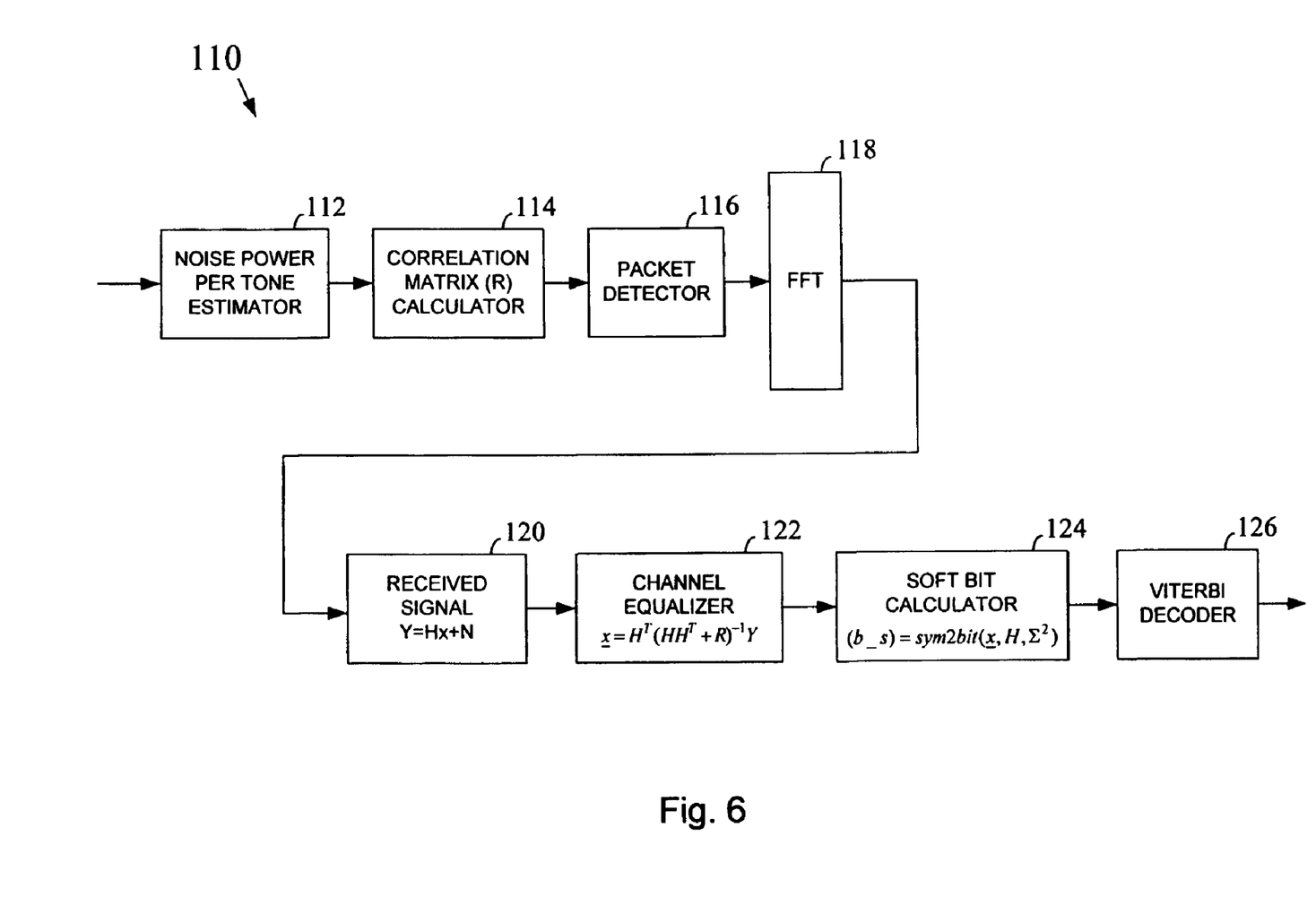
FIG. 6 is a block diagram illustrating a portion of an example receiver that may be used in a MIMO based system in accordance with an embodiment of the present invention.

FIG. 6 is a block diagram illustrating a portion of an example receiver 110 that may be used in a MIMO based system in accordance with an embodiment of the present invention. The receiver 110 may be used, for example, within the second wireless device 14 of FIG. 1 or within other wireless devices and systems. In the previously described embodiments, one of a number of different antennas was selected to be used during communication activity. In the receiver 110 of FIG. 6, the signal and noise components associated with multiple receive antennas are combined in a manner that reduces or eliminates the noise using MMSE techniques. As before, in the discussion that follows, a dual antenna arrangement is assumed. It should be appreciated that systems having more than two antennas may also be implemented.

As shown in FIG. 6, the receiver 110 may include one or more of: a noise power per tone estimator, 112, a correlation matrix calculator 114, a packet detector 116, an FFT 118, a minimum mean square error (MMSE) channel equalizer 122, a soft bit calculator 124, and a Viterbi decoder 126. The noise power per tone estimator 122 is coupled to each of the available receive antennas and estimates platform noise power per tone for each antenna. These estimates may be performed during, for example, a protocol quiet period. The correlation matrix calculator 114 then calculates a correlation matrix R for the two antennas (for each tone). This may also be performed during the protocol quiet period. In at least one embodiment, the correlation matrix R may be calculated as follows:

$$R = \begin{bmatrix} \sigma_1^2 & \rho\sigma_1\sigma_2 \\ (\rho\sigma_1\sigma_2)^\dagger & \sigma_2^2 \end{bmatrix}$$

where a $\sigma_1^2$ and $\sigma_2^2$ are the average noise powers for one tone at the main and auxiliary antennas, respectively, $\rho$ is the corresponding correlation coefficient, and $(\rho\sigma_1\sigma_2)^\dagger$ is the conjugate transpose of $(\rho\sigma_1\sigma_2)$. The correlation coefficient $\rho$ may be calculated as follows:

$$\rho = \frac{<n_1, n_2>}{\sqrt{<n_1, n_1><n_2, n_2>}}$$

where $n_1$ and $n_2$ are noise sequences from the first and second antenna, and $\sigma_1^2 = <n_1,n_1>$. After the correlation matrix R has been determined, it may be used to calculate the MMSE equalization response to be used by the MMSE channel equalizer 122 as follows:

$$G = H^{554}(HH^\dagger + R/\sigma_x^2)^{-1}$$

where G is the MMSE equalization response, H is the channel matrix, $H^{554}$ is the conjugate transpose of the channel matrix, R is the correlation matrix, and $\sigma_x^2$ is the transmit power. The channel H may be estimated (for each tone) using the MMSE algorithm as follows:

$$\hat{H} = X^\dagger(XX^{554}+R)^{-1}Y$$

where Y is the received signal (Y=Hx+N) and X=diag(x,x).

The packet detector 116 detects when a packet has been received by the receiver 110. After a packet has been detected, the packet detector 116 may open up the remainder of the receiver 110 to process the received packet. In the illustrated embodiment, packet detection is performed in the time domain using a sliding window correlation approach. However, in other embodiments, a frequency domain packet detection scheme may be employed, as discussed previously. The FFT 118 converts a received OFDM symbol from a time domain representation to a frequency domain representation. Although not shown, cyclic prefix removal will typically be employed. The frequency domain output of the FFT 118 is representative of the received signal 120 (i.e., Y=Hx+N for each tone). The MMSE channel equalizer 122 operates on the received signal Y, using the equalization response discussed above, to generate an estimate of the transmitted data x for the tone. This may be performed for each tone of the OFDM symbol.

The equalization performed within the MMSE channel equalizer 122 will often leave some residual noise within the resulting signal x. This noise may be further reduced by calculating soft bits and then inputting the soft bits to a Viterbi decoder. The soft bit calculator 124 generates soft bits for each tone based on the estimated data x. As in previous embodiments, the soft bit calculator 124 may utilize platform noise variance per tone information in the soft bit calculation. Because MMSE equalization has been performed, the soft bit calculator 124 utilizes the "residual" platform noise per tone (after MMSE equalization) in the calculation. In at least one embodiment, the residual noise variance per tone is calculated as follows:

$$\Sigma^2 = GRG^\dagger$$

where G is the MMSE equalization response and R is the correlation matrix. The Viterbi decoder 126 receives the soft bits calculated by the soft bit calculator 124 and uses then to determine the data most likely transmitted to the receiver 110.

Figure 7:
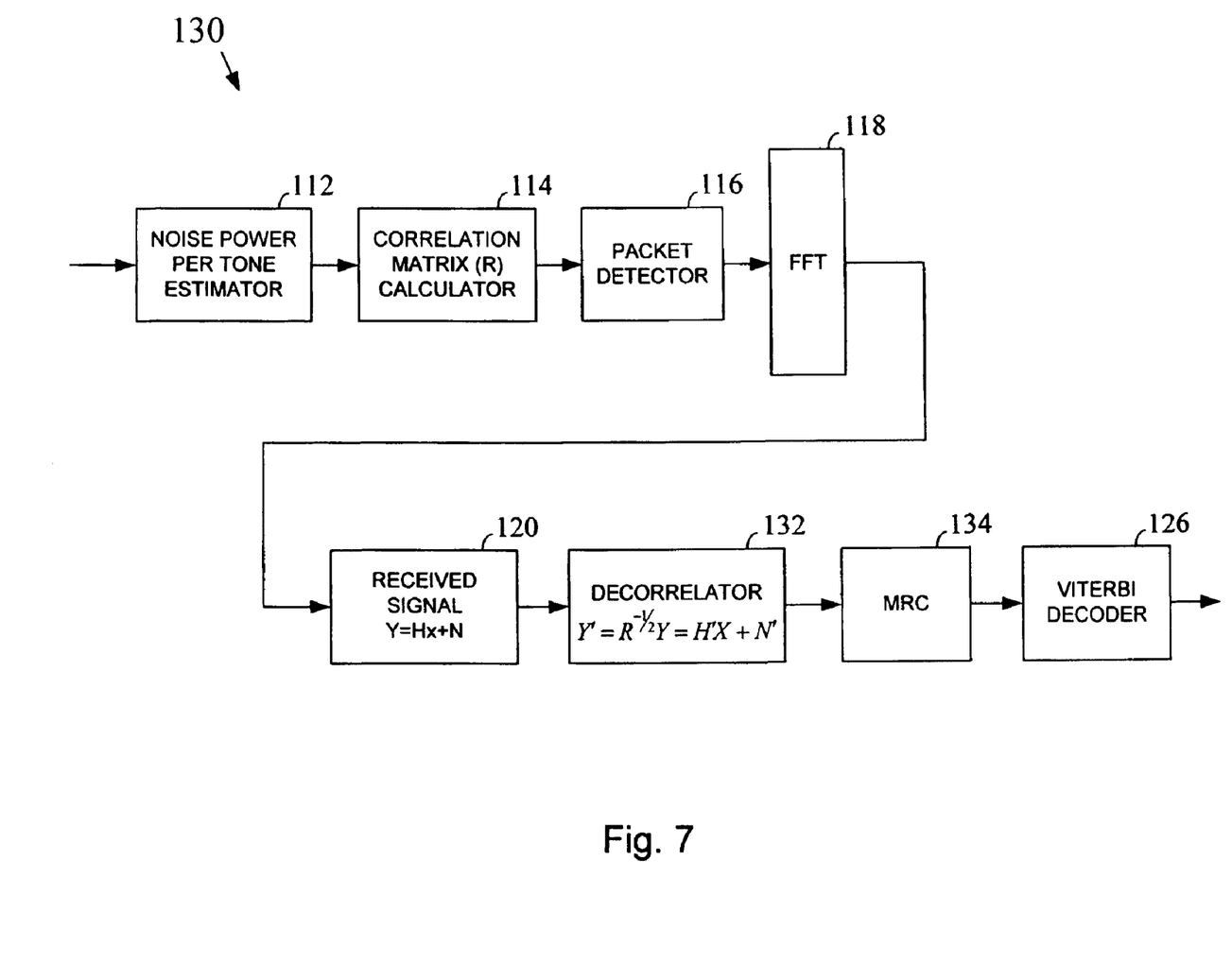
FIG. 7 is a block diagram illustrating a portion of an example receiver that may be used in a MIMO based system in accordance with another embodiment of the present invention.

Maximum Ratio Combining (MRC) is a technique that involves weighing the received signals at multiple receive antennas by their respective channel responses and then combining the signals. When the noise power at two receive antennas is equal and uncorrelated, MRC is optimal for maximizing output signal to noise ratio (SNR). Conversely, when the noise is not equal and is correlated, MRC is sub-optimal. In at least one embodiment of the present invention, a decorrelator is first used in a receive chain to decorrelate the platform noise received at two receive antennas. This essentially whitens the platform noise in a manner that removes the correlated portion of the noise and allows MRC to be implemented in an optimal or near optimal manner. FIG. 7 is a block diagram illustrating a portion of an example receiver 130 in accordance with an embodiment of the present invention. As illustrated, the receiver 130 may include one or more of: a noise power per tone estimator 112, a correlation matrix calculator 114, a packet detector 116, an FFT 118, a decorrelator 132, a maximum ratio combining (MRC) unit 134, and a Viterbi decoder 126. The noise power per tone estimator 112, the correlation matrix calculator 114, the packet detector 116, the FFT 118, and the Viterbi decoder 126 are substantially the same as those discussed in connection with the receiver 110 of FIG. 6.

The decorrelator 132 uses the correlation matrix R calculated by the correlation matrix calculator 114 to decorrelate the received signal Y. In at least one embodiment, this may be carried out using the following equation:

$$Y' = R^{-1/2}Y$$

where Y' is the decorrelated receive signal and R is the correlation matrix. After the decorrelator 132, the effective noise N' (i.e., N'=$R^{-1/2}$N) becomes decorrelated with equal power. The equivalent channel becomes H'=$R^{-1/2}$H. The received signals may now be input to the MRC 134 with the optimal performance conditions satisfied. The MRC 134 send the combined information to the Viterbi decoder 126, which uses the information to identify the data that was most likely transmitted to the receiver 130.

The techniques and structures of the present invention may be implemented in any of a variety of different forms. For example, features of the invention may be embodied within laptop, palmtop, desktop, and tablet computers having wireless capability; personal digital assistants (PDAs) having wireless capability; cellular telephones and other handheld wireless communicators; pagers; satellite communicators; cameras having wireless capability; audio, video, and multimedia devices having wireless capability; network interface cards (NICs) and other network interface structures; integrated circuits; as instructions and/or data structures stored on machine readable media; and/or in other formats. Examples of different types of machine readable media that may be used include floppy diskettes, hard disks, optical disks, compact disc read only memories (CD-ROMs), magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data. In at least one form, the invention is embodied as a set of instructions that are modulated onto a carrier wave for transmission over a transmission medium.

It should be appreciated that the individual blocks illustrated in the block diagrams herein may be functional in nature and do not necessarily correspond to discrete hardware elements. For example, in at least one embodiment, two or more of the blocks are implemented in software within a single (or multiple) digital processing device(s). The digital processing device(s) may include, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above. Hardware, software, firmware, and hybrid implementations may be used.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method comprising:
   estimating platform noise power per tone information during a quiet period in a wireless device;
   receiving an orthogonal frequency division multiplexing (OFDM) symbol from a wireless channel; and
   using said platform noise power per tone information to generate soft bits for said OFDM symbol for delivery to a Viterbi decoder within said wireless device, wherein using said platform noise power per tone information to generate soft bits includes:
   converting said OFDM symbol from a time domain representation to a frequency domain representation that includes a number of frequency domain data samples, each of said frequency domain data samples representing a received data symbol for a corresponding tone of said OFDM symbol;
   weighting said frequency domain data samples using said platform noise power per tone information; and
   delivering said weighted samples to a soft bit calculation unit for use in calculating soft bits, wherein said soft bit calculation unit assumes flat noise across the OFDM tones.

2. The method of claim 1, further comprising:
   storing said platform noise power per tone information in a memory after estimating, wherein using said platform noise power per tone information includes retrieving said platform noise power per tone information from said memory.

3. The method of claim 2, further comprising:
   repeating estimating and storing said platform noise power per tone information at predefined intervals.

4. The method of claim 1, further comprising:
   using said platform noise power per tone information to select one of a plurality of antennas for use in subsequent communication based on signal to interference plus noise ratio (SINR).

5. The method of claim 1, further comprising:
   using said platform noise power per tone information to perform frequency domain packet detection using a sliding window correlation in the frequency domain to detect a packet when received by said wireless device, wherein using said platform noise power per tone information to perform frequency domain packet detection includes discounting tones based on noise power level.

6. The method of claim 1, further comprising:
   using said platform noise power per tone information to perform pilot tracking with pilot tones within said OFDM symbol, wherein using said platform noise power per tone information to perform pilot tracking includes discounting pilot tones based on noise power level.

7. The method of claim 1, wherein:
   using said platform noise power per tone information to generate soft bits includes:
   generating channel estimates for said wireless channel using said frequency domain samples;
   weighting said channel estimates using said platform noise power per tone information to generate weighted channel estimates; and
   delivering said weighted channel estimates to a soft bit calculation unit for use in calculating soft bits.

8. An apparatus comprising:
   a noise power per tone estimator to estimate platform noise power per tone during a quiet period when no communication activity is occurring;
   a discrete Fourier transform (DFT) unit to convert a received orthogonal frequency division multiplexing (OFDM) symbol from a time domain representation to a frequency domain representation, said frequency domain representation including a number of frequency domain samples, each of said frequency domain samples representing a received data symbol for a corresponding tone of said OFDM symbol;
   a soft bit generation subsystem to generate soft bits for said received OFDM symbol using said platform noise power per tone information generated by said noise power per tone estimator;
   a Viterbi decoder to process said soft bits; and
   a frequency domain packet detector, coupled to receive an output of said discrete Fourier transform unit, to detect the reception of a packet by said apparatus using a sliding window correlation in the frequency domain, said frequency domain packet detector to utilize said platform noise power per tone information estimated by said noise power per tone estimator in performing the sliding window correlation to reduce the occurrence of packet detect false alarms within said apparatus.

9. The apparatus of claim 8, further comprising:
   a memory to store said platform noise power per tone information estimated by said noise power per tone estimator, wherein said soft bit generation subsystem retrieves said platform noise power per tone information from said memory when needed to generate soft bits.

10. The apparatus of claim 8, wherein:
    said soft bit generation subsystem includes:
    a noise power per tone weighting unit to weight said frequency domain samples using said platform noise power per tone information to generate weighted samples; and
    a soft bit calculation unit to calculate said soft bits using said weighted samples, wherein said soft bit calculation unit assumes flat noise across the OFDM tones.

11. The apparatus of claim 8, wherein:
    said soft bit generation subsystem includes a soft bit calculation unit to receive said platform noise power per tone information at an input thereof and to calculate said soft bits using said platform noise power per tone information.

12. The apparatus of claim 8, wherein:
    said soft bit generation subsystem includes:
    a channel estimator to generate channel estimates for said wireless channel using said frequency domain samples and to weight said channel estimates using said platform noise power per tone information to generate weighted channel estimates; and
    a soft bit calculation unit to receive said frequency domain samples, said channel estimates, and said weighted channel estimates for use in generating said soft bits.

13. The apparatus of claim 8, further comprising:
    an antenna selector to select one of a plurality of antennas to use during subsequent communication activity, said antenna selector to use platform noise power per tone information estimated by said noise power per tone estimator to select said antenna based on signal to interference plus noise ratio (SINR).

14. The apparatus of claim 8, further comprising:
a pilot tracking unit, coupled to receive outputs of said discrete Fourier transform unit that are associated with pilot tones of an OFDM receive symbol, to perform pilot tracking for said apparatus, said pilot tracking unit to utilize said platform noise power per tone information estimated by said noise power per tone estimator to discount pilot tones that have a high level of platform noise.

15. A system comprising:
at least two dipole antennas;
a noise power per tone estimator to estimate platform noise power per tone during a quiet period when no communication activity is occurring;
a discrete Fourier transform (DFT) unit to convert a received orthogonal frequency division multiplexing (OFDM) symbol from a time domain representation to a frequency domain representation, said frequency domain representation including a number of frequency domain samples, each of said frequency domain samples representing a received data symbol for a corresponding tone of said OFDM symbol;
a soft bit generation subsystem to generate soft bits for said received OFDM symbol using said platform noise power per tone information generated by said noise power per tone estimator;
a Viterbi decoder to process said soft bits; and
a frequency domain packet detector, coupled to receive an output of said discrete Fourier transform unit, to detect the reception of a packet by said apparatus using a sliding window correlation in the frequency domain, said frequency domain packet detector to utilize said platform noise power per tone information estimated by said noise power per tone estimator in performing the sliding window correlation to reduce the occurrence of packet detect false alarms within said apparatus.

16. The system of claim 15, further comprising:
a memory to store said platform noise power per tone information estimated by said noise power per tone estimator, wherein said soft bit generation subsystem retrieves said platform noise power per tone information from said memory when needed to generate soft bits.

17. The system of claim 15, wherein:
said soft bit generation subsystem includes:
  a noise power per tone weighting unit to weight said frequency domain samples using said platform noise power per tone information to generate weighted samples; and
  a soft bit calculation unit to calculate said soft bits using said weighted samples, wherein said soft bit calculation unit assumes flat noise across the OFDM tones.

18. The system of claim 15, wherein:
said soft bit generation subsystem includes a soft bit calculation unit to receive said platform noise power per tone information at an input thereof and to calculate said soft bits using said platform noise power per tone information.

19. The system of claim 15, wherein:
said soft bit generation subsystem includes:
  a channel estimator to generate channel estimates for said wireless channel using said frequency domain samples and to weight said channel estimates using said platform noise power per tone information to generate weighted channel estimates; and
  a soft bit calculation unit to receive said frequency domain samples, said channel estimates, and said weighted channel estimates for use in generating said soft bits.

20. An article comprising a storage medium having instructions stored thereon that, when executed by a computing platform, operate to:
acquire platform noise per tone information for a wireless device;
receive an orthogonal frequency division multiplexing (OFDM) symbol from a wireless channel; and
use said platform noise power per tone information to generate soft bits for said OFDM symbol for delivery to a Viterbi decoder within said wireless device, wherein operation to use said platform noise power per tone information to generate soft bits includes operation to:
  convert said OFDM symbol from a time domain representation to a frequency domain representation that includes a number of frequency domain data samples, each of said frequency domain data samples representing a received data symbol for a corresponding tone of said OFDM symbol;
  weight said frequency domain data samples using said platform noise power per tone information; and
  deliver said weighted samples to a soft bit calculation unit for use in calculating soft bits, wherein said soft bit calculation unit assumes flat noise across the OFDM tones.

21. The article of claim 20, wherein:
operation to acquire platform noise per tone information for a wireless device includes operation to retrieve said platform noise power per tone information from a memory within said wireless device.

22. The article of claim 20, wherein said instructions further operate to:
select one of a plurality of antennas associated with said wireless device for use in subsequent communication based on signal to interference plus noise ratio (SINR) using said platform noise power per tone information.

23. The article of claim 20, wherein said instructions further operate to:
perform frequency domain packet detection to detect an incoming packet using a sliding window correlation in the frequency domain that uses said platform noise power per tone information to discount tones based on noise power level.

24. The article of claim 20, wherein said instructions further operate to:
perform pilot tracking with pilot tones within a received OFDM symbol using said platform noise power per tone information to discount pilot tones based on noise power level.

25. The article of claim 20, wherein:
operation to use said platform noise power per tone information to generate soft bits includes operation to:
generate channel estimates for said wireless channel using said frequency domain samples;
weight said channel estimates using said platform noise power per tone information; and
process said frequency domain samples, said channel estimates, and said weighted channel estimates to generate said soft bits.

* * * * *